United States Patent

Marsden et al.

Patent Number: 5,885,027
Date of Patent: Mar. 23, 1999

[54] TRANSMISSION LINE INSTALLATION

[75] Inventors: Stephen A. Marsden, Bury St. Edmunds; Paul F. Wettengel; Austin B. Gumbs, both of Ipswich, all of Great Britain

[73] Assignee: British Telecommunications public limited company, London, England

[21] Appl. No.: 765,886

[22] PCT Filed: Jul. 5, 1995

[86] PCT No.: PCT/GB95/01579

§ 371 Date: Jan. 29, 1997

§ 102(e) Date: Jan. 29, 1997

[87] PCT Pub. No.: WO96/02012

PCT Pub. Date: Jan. 25, 1996

[30] Foreign Application Priority Data

Jul. 8, 1994 [EP] European Pat. Off. ............. 94305033

[51] Int. Cl.⁶ .............................. F16L 55/18; F16L 55/26
[52] U.S. Cl. ............................................ 405/154; 405/184
[58] Field of Search ................................. 405/154, 184; 175/21, 67; 299/17

[56] References Cited

U.S. PATENT DOCUMENTS

| | | | |
|---|---|---|---|
| 3,805,899 | 4/1974 | Hicks et al. | 175/62 X |
| 3,874,463 | 4/1975 | Hicks et al. | 175/62 X |
| 4,385,667 | 5/1983 | Reichman et al. | 175/53 |
| 4,403,667 | 9/1983 | Reichman et al. | 175/230 |
| 4,519,462 | 5/1985 | Kelley | 175/53 |
| 4,534,425 | 8/1985 | Reichman et al. | 175/53 |
| 4,538,522 | 9/1985 | Kelley | 104/287 |
| 4,593,772 | 6/1986 | Kelley | 175/53 |
| 4,647,251 | 3/1987 | Gale | 405/154 |
| 4,821,815 | 4/1989 | Baker et al. | 175/26 |
| 4,856,600 | 8/1989 | Baker et al. | 175/26 |
| 4,896,733 | 1/1990 | Baker et al. | 175/26 |
| 5,096,000 | 3/1992 | Hesse | 175/22 |

FOREIGN PATENT DOCUMENTS

| | | |
|---|---|---|
| 0246865 | 11/1987 | European Pat. Off. . |
| 0306112 | 3/1989 | European Pat. Off. . |
| 0606711 A1 | 7/1994 | European Pat. Off. . |
| 3826513 C2 | 2/1990 | Germany . |
| WO 95/07475 | 3/1995 | WIPO . |
| WO 95/07476 | 3/1995 | WIPO . |
| WO 95/07477 | 3/1995 | WIPO . |
| WO 95/07478 | 3/1995 | WIPO . |
| WO 95/07486 | 3/1995 | WIPO . |
| WO 95/23987 | 9/1995 | WIPO . |
| WO 95/23988 | 9/1995 | WIPO . |

*Primary Examiner*—Tamara L. Graysay
*Assistant Examiner*—Tara L. Mayo
*Attorney, Agent, or Firm*—Nixon & Vanderhye P.C.

[57] ABSTRACT

A method of installing a transmission line (such as an optical fibre telecommunications line) in the ground includes the steps of forming a tunnel in the ground using a mole constituted by a water-jetting head and piping for supplying pressurized water to the head, and positioning the transmission line in the tunnel. The head is guided along a pre-installed buried elongate member such as a twisted copper pair telecommunications line.

17 Claims, 1 Drawing Sheet

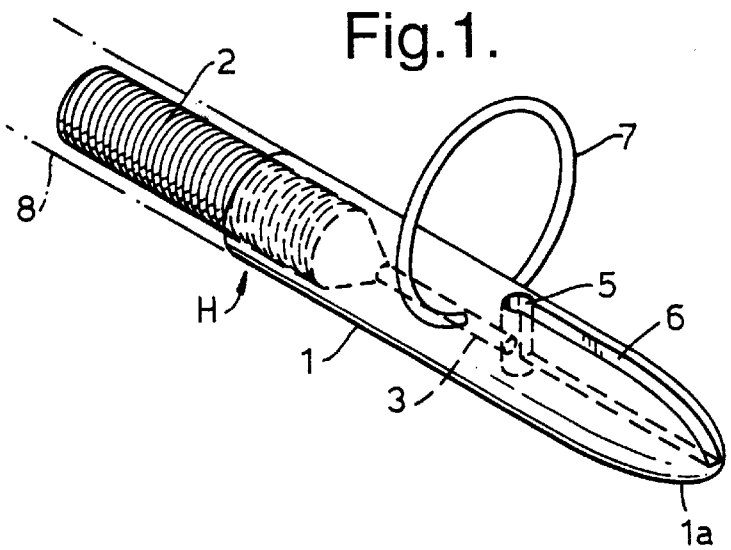
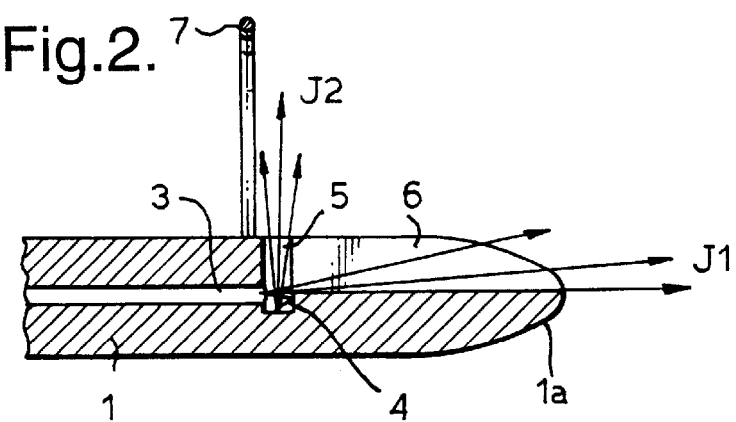
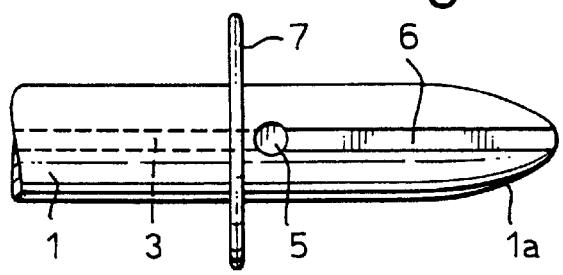
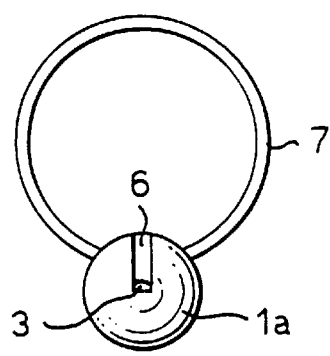
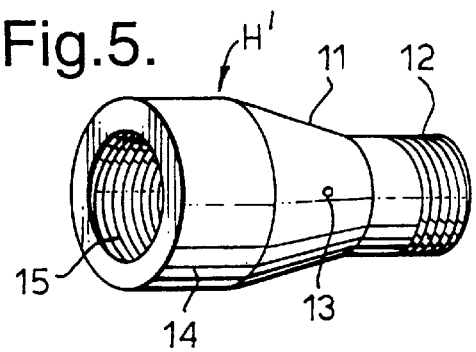

TRANSMISSION LINE INSTALLATION

BACKGROUND OF THE INVENTION

1. Field of the Invention

This invention relates to apparatus for, and a method of, installing a transmission line such as an optical fibre telecommunications line.

2. Related Art

In the United Kingdom, the telecommunications network includes a trunk network which is substantially completely constituted by optical fibre, and a local access network which is substantially completely constituted by copper pairs. Flexibility in the copper access network is provided at two points en route to the customer; firstly, at street-side cabinets serving up to 600 lines; and secondly, at distribution points serving around 10–15 lines. Eventually, it is expected that the entire network, including the access network, will be constituted by fibre.

The ultimate goal is a fixed, resilient, transparent telecommunications infrastructure for the optical access network, with capacity for all foreseeable service requirements. One way of achieving this would be to create a fully-managed fibre network in the form of a thin, widespread overlay for the whole access topography as this would exploit the existing valuable access network infrastructure. Such a network could be equipped as needs arise, and thereby could result in capital expenditure savings, since the major part of the investment will be the provision of terminal equipment on a 'just in time' basis. It should also enable the rapid provision of extra lines to new or existing customers, and flexible provision or reconfiguration of telephony services.

In order to be completely future proof, the network should be single mode optical fibre, with no bandwidth limiting active electronics within the infrastructure. Consequently, only passive optical networks (PONs) which can offer this total transparency and complete freedom for upgrade, should be considered.

The most common passive optical network is the simplex single star, with point-to-point fibre for each transmit and receive path, from the exchange head end (HE) to the customer network terminating equipment (NTE). This network design has been used throughout the world and meets all the access criteria. It involves high fibre count cables, and unique electro-optic provision at HE and NTE for each customer. The resulting inherent cost can only be justified for large business users, who generally also require the security of diverse routing, which increases the cost still further.

The advent of optical splitters and wavelength-flattened devices has enabled the concept of the PON to be taken one step further. These passive components allow the power transmitted from a single transmitter to be distributed amongst several customers, thereby reducing and sharing the capital investment.

The use of splitter based PON architecture thus reduces the cost of fibre deployment in the access network. When compared with point-to-point fibre, savings will result from:

(i) reducing the number of fibres at the exchange and in the network;

(ii) reducing the amount of terminal equipment at the exchange;

(iii) sharing the cost of equipment amongst a number of customers;

(iv) providing a thin, widespread, low cost, fibre infrastructure; and (v) providing a high degree of flexibility, and allowing 'just in-time' equipment and service provision.

Additionally, PON architecture can be tailored to suit the existing infrastructure resources (duct and other civil works).

It will be apparent that upgrading the entire UK access network from copper to fibre will involve a major capital investment program. It is important, therefore, to minimize costs wherever possible. The specifications of our published International patent applications WO95/07475, WO95/07476, WO95/07477. WO95/07478 & WO95/107486 describe a fibre management system which aims to reduce the cost of providing fibre from local exchanges to the network nodes (equivalent to the distribution points of the copper access network) nearest the customers. The specifications of our published International patent applications GB95/00449 and GB95/00450 describe a way of minimizing the cost of getting fibre into a customer's premises via a customer lead in (CLI) provided in an external wall of the premises. The present invention is concerned with minimizing the cost of getting fibre from just outside a customer's premises to the nearest network node.

German, patent number DE3826513 discloses a method for laying a transmission line under the ground alternative to the established method of digging a trench in the ground along the intended route of the line, laying the line into the trench and then backfilling to bury the line. One embodiment of the apparatus has a pneumatically driven tunnelling head whose route is guided by a C-shaped guide attachment mounted on the end of an arm extending radially from the tunnelling head.

Published UK patent application number 2085670 discloses a device for loosening the earth around a previously buried cable. The device has a main body comprising inner and outer cylindrical sections, which are moved alternatively, by hydraulic means, relative to one another, such that the apparatus moves along the previously buried cable with a "shinning" movement. As the apparatus moves along the cable, water is supplied to the apparatus and is ejected through nozzles at the front of the apparatus to loosen the earth around the cable in front of the apparatus.

SUMMARY OF THE INVENTION

The present invention provides a method of installing a transmission line in the ground, the method comprising the steps of forming a tunnel in the ground using a mole constituted by a water-jetting head and piping for supplying pressurized water to the head, and positioning the transmission line in the tunnel, wherein the head is guided along a pre-installed buried elongate member by manually pushing the piping thereby forming the tunnel adjacent to the elongate member.

The pre-installed buried elongate member may be an underground service pipe (water or gas) or cable. Preferably, this member is a telecommunications line such as a twisted copper pair. The method of the invention thus permits the installation of a new telecommunications line using an old telecommunications line as a guide, thereby providing a cost-effective way of installing the new telecommunications line from the curtilage to the CLI.

Advantageously, the transmission line is a ruggedized optical fibre which is rodded into the tunnel after the mole has been withdrawn.

Alternatively, the transmission line is an optical fibre transmission line which is propelled along the tunnel by fluid drag of gaseous medium passed through the tunnel, the optical fibre transmission line being installed in the tunnel after the mole has been withdrawn. In this case, a tubular pathway may be positioned within the tunnel prior to the propelling of the optical fibre transmission line, the optical fibre transmission line being propelled along the tubular pathway by fluid drag of said gaseous medium.

The tubular pathway may be constituted by tubing which is connected to the moie at the head end thereof, the tubing being positioned in the tunnel by subsequently withdrawing the mole from the tunnel.

Preferably, the method further comprises the step of removing the head from the piping of the mole, connecting a second water-jetting head to the piping, attaching the tubing to the second head, and removing the mole from the tunnel.

The invention also provides a cutting head for a water-jetted mole, the cutting head comprising an elongate main body portion formed with a longitudinally-extending bore for supplying pressurized water to a deflection face formed within the main body portion, a guide member fixed to the main body portion in the region of the deflection face, the guide member being sized and shaped for engagement with a buried elongate guide, an axially-extended slot formed in the main body portion on the other side of the deflection face to the bore, the slot being aligned with the bore and extending to the free end of the main body portion thereby defining a passage for producing a first, axially-directed water jet which, in use, cuts a tunnel along the side of the guide, and the deflection face being such as to deflect some of the water supplied along the bore so as to define a second, transversely-directed water jet which, in use, washes over the guide member.

Conveniently, a deflection face is defined by a radial blind bore formed in the main body portion, the radial blind bore intersecting said first-mentioned bore.

Advantageously, the main body portion is provided with an externally-threaded extension portion at that end thereof remote from the axial slot.

Preferably, the guide member is constituted by a guide ring, and one end of the guide ring is fixed to the main body portion, and the other end of the ring is detachably fixed to the main body portion. This facilitates positioning of the guide ring over the buried elongate guide.

BRIEF DESCRIPTION OF THE DRAWINGS

The invention will now be described in greater detail, by way of example, with reference to the accompanying drawings, in which:

FIG. 1 is a perspective view of the cutting head of a guided water-jetted mole constructed in accordance with the invention;

FIG. 2 is an axial cross-section taken through the front portion of the cutting head of FIG. 1;

FIG. 3 is a plan view of the cutting head front portion;

FIG. 4 is a front elevation of the cutting head of FIG. 1; and

FIG. 5 is an axial cross-section taken through the front portion of a modified form of cutting head.

DETAILED DESCRIPTION OF EXEMPLARY EMBODIMENTS

Referring to the drawings, FIG. 1 shows a cutting head H made of stainless steel. The cutting head H has a main body portion 1 and a screw-threaded shank 2. The front end of the main body portion 1 (that is to say that end remote from the shank 2) is shaped to define a tapered nose portion 1a. The main body portion 1 is formed with an axial bore 3 (see FIG. 2) which is contiguous with a bore (not shown) in the shank 2. The bore 3 terminates at a deflection face 4 formed in the main body portion 1 by a cylindrical, radial blind bore 5. An axial slot 6 extends forwardly of the bore 5, terminating at the free end of the tapered nose portion 1a. The main body portion 1 is provided with a flexible guide ring 7 made from a multi-stranded, high tensile steel wire which is surrounded by short tube sections which act as rollers. One end of the guide ring 7 is permanently fixed to the main body portion 1, the other end being detachably fixed to the main body portion by means of a grub screw (not shown). The guide ring 7 is positioned just behind the deflection face 4.

The cutting head H is used with a plurality of stainless steel tubes 8 (one of which is shown in FIG. 1), each of which has an internally-threaded portion at one end and an externally-threaded portion at the other end. The tubes 8 each have a length of 2 m, an external diameter of 10 mm and an internal diameter of 6 mm. A first of the tubes 8 can be fixed to the screw-threaded shank 2 of the cutting head H by means of its internally-threaded end portion. Subsequently, further tubes 8 can be added (in a manner described below) by interengagement of adjacent internally-threaded and externally-threaded end portions.

The mole described above can be used to tunnel through the earth to provide a route for the subsequent installation of a telecommunications line such an optical fibre line. In particular, the mole can be used to tunnel from the curtilage of a customer's premises to the customer lead in point provided in the wall of those premises.

In order to guide the mole from the curtilage to the CLI, use is made of any service cable or pipe already buried in the ground. Preferably, where there is an existing telecommunications line (i.e. a copper pair) already buried in the ground, this is used to guide the mole. In this case, the first step of the tunnelling process is to dig a small pit at the curtilage so as to expose the buried telecommunications line (drop cable). The guide ring 7 of the cutting head H is then positioned over the cable by releasing the grub screw, positioning the ring over the cable, and then re-applying the grub screw. A first stainless steel tube 8 is then threaded onto the shank 2 of the cutting head. The free end of the rod 8 is then connected to a Gerni 600 p water lance (not shown) which is supplied with water at a pressure of 2350 psi at a rate of between 17 and 18 litres per minute.

Pressurized water is then supplied to the cutting head H by pressing the trigger of the water lance. Pressurized water is then forced along the bore 3 and against the deflection face 4, resulting in the formation of two separate water jets J1 and J2 (see FIG. 2). The water jet J1 is directed generally along the axial slot 6 towards the tapered nose portion 1a of the cutting head H. This jet J1 is effective to cut a tunnel in the earth in the region of the guiding cable. The other jet J2 is directed upwardly towards the cable and the guide ring 7. This jet J2 forces pressurized water around the cable and the guide ring 7 to prevent earth and stones jamming between the guide ring and the cable, and so preventing the forward movement of the cutting head H. Once the water has been turned on, the operator pushes the tube 8 into the ground. As this occurs, the water jet J1 tunnels into the earth thereby forming a bore adjacent to the guide cable. When the tube 8 has been advanced until the water lance is about to enter the pit, the water is turned off, the lance is unscrewed from the free end of tube 8, and a further tube 8 is threaded onto the first tube 8. The lance is then screwed onto the free end of this second tube 8, the water is turned on again, and the cutting head H is rodded further into the ground by the operator. The procedure is repeated until the cutting head is beneath the customer lead-in point in the wall of the customer's premises. A small pit is then dug at this point to reveal the cutting head H. The cutting head H is then removed from the first tube 8, the tubes 8 are withdrawn from the pit at the curtilage, and a ruggedized optical fibre cable is rodded into the tunnel from either end.

Alternatively, a modified form of cutting head H' (see FIG. 5) is fixed to the internally-threaded portion of the first tube 8 by means of an externally threaded shank 12 formed at one end of a main body portion 11. The main body portion 11 and the shank 12 are formed with a central blind bore (not shown) for feeding water to a number of water jets 13 (only one of which can be seen) formed in the main body portion. An extension 14 is formed on that side of the main body portion 11 remote from the shank 12, the extension being provided with an internally-threaded shank portion 15. In use, a tube clamp (not shown) formed with an externally threaded shank is screwed into the internally-threaded shank portion 15, and a blown fibre tube is fixed in the clamp. This tube is typically made of a polymer such as a high density polythene, and has an outer diameter of 8 mm and an inner diameter of 3.5 mm. The tube is preferably supplied from a coil. Pressurized water is then supplied to the cutting head H' by pressing the trigger of the water lance, and the line of tubes 8 and the cutting head H' are withdrawn from the tunnel by pulling from the pit at the curtilage. As the cutting head H' travels along the tunnel water escaping from the jets 13 is effective to remove any earth or stone which might otherwise impede its passage. When the cutting head H' reaches the pit at the curtilage, the blown fibre tube is removed from its clamp, after which an optical fibre cable can be blown through the tube in the known manner.

In some cases, it may be possible to replace the cutting head H' by a simple threaded member for fixing to the first tube 8 and for threading in a tube clamp.

It will be apparent that the method and apparatus described above could be modified. For example, in order to reduce the amount of effort needed to install the tubes 8, a wetting agent could be added to the water supplied to the lance. A suitable wetting agent, which should be biodegradable in soil, is a Sub-soil Boring Fluid supplied by Enviro Chem.

It would also be possible to install ducting for housing a new transmission line at the same time as the mole cuts the tunnel. For example, lengths of plastics tubing could be pushed over the tubes 8 as the mole is rodded in, the lengths of tubing being glued together, as they are added, using plastics collars.

The method of the invention results in a time-saving of approximately 70% (when compared with standard open trench and back fill methods or those utilizing pneumatic moles) in the upgrade of direct buried telecommunications line customer feeds. This assumes a mixture of grass, flower beds and paving that would be considered a typical front garden. The method requires the digging of only two small pits, one at either end of the feed, and this minimizes re-instatement costs. At the same time, there is minimized disruption to areas that have public access and to the customer's property. Moreover, the method of the invention involves a single man, low skill operation, and so is cheap to carry out.

Although the method of the invention is intended primarily for the replacement of direct, in ground, customer drop cables, scaled versions of the technique could be used to replace any of the other utility lead-ins, for example gas pipes, water pipes, electric cables etc. In addition to the customer premises to curtilage location, scaled versions of the technique could be used for replacement of directly buried cables, ducts and pipes throughout the network infrastructure of all the utilities. In particular, for telecommunications applications, in addition to the customer drop provision, the method of the invention could be used for the replacement and upgrading of distribution cables in frontage "T" topologies, in the replacement of damaged directly buried cable throughout the network, and in the replacement of blocked lead-in ducts.

What is claimed is:

1. A tunnelling apparatus comprising:

a tunnelling head having a guide means formed for sliding engagement with a pre-installed elongate member;

said guide means being offset on said tunnelling head so that, in use, said tunnelling apparatus forms a tunnel, spaced from, and substantially parallel to, said pre-installed elongate member;

said tunnelling head including a fluid jet forming head;

a length of piping for carrying fluid to said tunneling head, said piping being connected, in use, to said tunneling head and having sufficient rigidity to enable the tunneling head to be manually pushed using said piping; and said guide means being releasably engageable with said pre-installed elongate member.

2. A method of installing a transmission line in the ground, using the tunnelling apparatus as in claim 1, said method comprising the steps of:

engaging said guide means with a pre-installed buried elongate member;

attaching said piping to said tunnelling head;

supplying pressurized fluid to the jet forming head;

manually pushing said piping substantially in the direction of said pre-installed elongate member, to form thereby a tunnel alongside said pre-installed elongate member; and positioning a transmission line in the tunnel so formed.

3. A method as in claim 2 wherein said transmission line is a ruggedized optical fibre and said transmission line positioning step comprises:

withdrawing the tunnelling apparatus; and rodding said fibre into the tunnel.

4. A method as in claim 2, wherein said transmission line is an optical fibre and said transmission line positioning step comprises:

withdrawing the tunnelling apparatus; and propelling said fibre along the tunnel by the fluid drag of a gaseous medium passed through the tunnel.

5. A method as in claim 2, wherein said transmission line is an optical fibre and said transmission line positioning step comprises:

withdrawing the tunnelling apparatus;

positioning a tubular pathway within the tunnel; and passing a gas along the tubular pathway to propel said optical fibre by the fluid drag of the gas.

6. A method as in claim 2, wherein said transmission line is an optical fibre, and said transmission line positioning step comprises:

connecting tubing to said tunnelling apparatus;

withdrawing the tunnelling apparatus from the tunnel thereby drawing the tubing through the tunnel;

passing gas along said tubing to propel the optical fibre along said tubing by fluid drag of said gas.

7. A method as in claim 2 wherein said transmission line is an optical fibre, and said transmission line positioning step includes:

removing the fluid jet forming head from the piping;

connecting a second head to the piping;

attaching tubing to the second head; and withdrawing the second head and piping from the tunnel thereby drawing said tubing through the tunnel.

8. A method as in claim 2 wherein said fluid comprises water.

9. A method as in claim 2 wherein said fluid comprises water and a wetting agent.

10. A cutting head for a tunnelling apparatus, said head comprising:

an elongate main body portion; and a guide member attached to the main body portion;

said guide member being sized and shaped for engagement with a pre-installed elongate member;

said elongate main body portion being formed with a longitudinally-extending bore for supplying pressurized fluid to a deflection face formed within said main body portion, said guide member being attached to the main body portion in the region of the deflection face, said main body portion further being formed with an axially extended slot on the other side of the deflection face to the bore, the slot being aligned with the bore and extending to a free end of the main body portion thereby defining a passage for producing a first, axially directed fluid jet which, in use, cuts a tunnel along the side of the guide, and the deflection face being such as to deflect some of the fluid supplied along the bore so as to define a second, transversely directed fluid jet which, in use, washes over the guide member.

11. A head as in claim 10, wherein the deflection face is defined by a radial blind bore formed in the main body portion, the radial blind bore intercepting said longitudinal bore.

12. A head as in claim 10, wherein said free end of the main body portion is tapered.

13. A head as in claim 10, wherein the main body portion is provided with an externally threaded extension portion at one end.

14. A head as in claim 10, wherein the guide member comprises a guide ring.

15. A head as in claim 14, wherein:

one end of the guide ring is fixed to the main body portion, and the other end of the guide ring is detachably attached to the main body portion.

16. A tunneling apparatus comprising:

a tunneling head having a fluid jet forming head and having a guide formed for sliding engagement with a pre-installed elongate member;

said guide being releasably engageable with said pre-installed elongate member and radially offset from a longitudinal axis of the tunneling head such that said tunneling apparatus forms a tunnel, spaced from and substantially parallel to said pre-installed elongate member; and a length of piping for carrying water to said head, said piping being connectable to said head and having sufficient rigidity to enable the head to be manually pushed using said piping.

17. A cutting head for a tunneling apparatus comprising:

an elongate main body portion;

a guide member attached to the main body portion, said guide member being sized and shaped for engagement with a pre-installed elongate member;

said elongate main body portion being formed with a longitudinally extending bore for supplying pressurized fluid to a deflection face formed within said main body portion, said guide member being attached to the main body portion in the region of the deflection face, said main body portion further being formed with an axially extended slot on the other side of the deflection face to the bore, the slot being aligned with the bore and extending to a free end of the main body portion thereby defining a passage for producing a first, axially directed water jet which, in use, cuts a tunnel along the side of the guide member, and the deflection face being such as to deflect some of the water supplied along the bore so as to define a second, transversely directed water jet which, in use, washes over the guide member.

\* \* \* \* \*